(12) United States Patent
Phatak et al.

(10) Patent No.: US 8,853,135 B2
(45) Date of Patent: Oct. 7, 2014

(54) METHOD FOR TREATING WELLBORE IN A SUBTERRANEAN FORMATION WITH HIGH DENSITY BRINES AND COMPLEXED METAL CROSSLINKERS

(75) Inventors: Alhad Phatak, Houston, TX (US); Michael D. Parris, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 222 days.

(21) Appl. No.: 12/643,387

(22) Filed: Dec. 21, 2009

(65) Prior Publication Data

US 2010/0130388 A1    May 27, 2010

Related U.S. Application Data

(63) Continuation-in-part of application No. 12/116,730, filed on May 7, 2008, now Pat. No. 8,697,610, and a continuation-in-part of application No. 12/116,759, filed on May 7, 2008, now Pat. No. 7,786,050.

(51) Int. Cl.

| | | |
|---|---|---|
| C09K 8/68 | (2006.01) |
| C09K 8/72 | (2006.01) |
| C09K 8/10 | (2006.01) |
| C23F 11/18 | (2006.01) |
| E21B 43/26 | (2006.01) |
| C09K 8/90 | (2006.01) |
| C09K 8/512 | (2006.01) |
| C09K 8/08 | (2006.01) |
| C09K 8/575 | (2006.01) |
| C09K 8/88 | (2006.01) |

(52) U.S. Cl.
CPC . *C09K 8/90* (2013.01); *C09K 8/685* (2013.01); *C09K 8/512* (2013.01); *C09K 8/08* (2013.01); *C09K 8/5756* (2013.01); *C09K 8/887* (2013.01)

USPC .......... 507/211; 507/215; 507/216; 507/217; 507/271; 166/308.1

(58) Field of Classification Search
CPC .............. C09K 8/04; C09K 8/20; C09K 8/62; C09K 8/66; C09K 8/685; Y10S 507/903; Y10S 507/922; E21B 43/26
USPC ........ 507/215, 271, 211, 216, 217; 166/308.1
See application file for complete search history.

(56) References Cited

U.S. PATENT DOCUMENTS

| | | |
|---|---|---|
| 3,058,909 A | 10/1962 | Kern |
| 3,301,723 A | 1/1967 | Chrisp |

(Continued)

FOREIGN PATENT DOCUMENTS

| | | |
|---|---|---|
| EP | 92755 A1 | 11/1983 |
| EP | 0390279 | 5/1993 |

(Continued)

OTHER PUBLICATIONS

Harry, D.N., Moorhouse, R., Matthews, L., Chen, G. Rheological Responses to Variations in Aqueous-Based Zirconium Crosslinker Chemistry. SPE 37280 (1997) p. 669-674.

(Continued)

*Primary Examiner* — Aiqun Li
(74) *Attorney, Agent, or Firm* — Jeremy D. Tillman; Rachel E. Greene; Tim Curington

(57) ABSTRACT

The invention discloses a method of treating a wellbore by providing an aqueous mixture of a hydrated polysaccharide with a salt; adding to the mixture a cross-linking agent for cross-linking the hydrated polysaccharide, wherein the cross-linking agent comprises a zirconium compound, glutamic acid, and a polyol; pumping the aqueous mixture of the hydrated polysaccharide and the cross-linking agent into the wellbore; and cross-linking the hydrated polysaccharide.

21 Claims, 4 Drawing Sheets

(56) References Cited

U.S. PATENT DOCUMENTS

| | | | |
|---|---|---|---|
| 3,692,676 | A | 9/1972 | Cutler |
| 3,888,312 | A | 6/1975 | Tiner |
| 3,937,283 | A | 2/1976 | Blauer et al. |
| 3,974,077 | A | 8/1976 | Free |
| 4,148,812 | A | 4/1979 | Rubino et al. |
| 4,460,751 | A | 7/1984 | Hanlon et al. |
| 4,477,360 | A * | 10/1984 | Almond ............... 507/203 |
| 4,480,696 | A | 11/1984 | Almond |
| 4,514,309 | A * | 4/1985 | Wadhwa ............... 507/211 |
| 4,552,674 | A | 11/1985 | Brown |
| 4,579,670 | A | 4/1986 | Payne |
| 4,604,218 | A | 8/1986 | Dawson |
| 4,627,495 | A | 12/1986 | Harris |
| 4,686,052 | A | 8/1987 | Baranet |
| 4,693,885 | A * | 9/1987 | Bommer et al. ........ 424/9.61 |
| 4,780,223 | A | 10/1988 | Baranet |
| 4,808,739 | A | 2/1989 | Putzig |
| 4,885,103 | A | 12/1989 | Putzig |
| 4,946,604 | A | 8/1990 | Smith |
| 4,960,527 | A | 10/1990 | Penny |
| 5,165,479 | A | 11/1992 | Harris |
| 5,217,632 | A | 6/1993 | Sharif |
| 5,259,455 | A | 11/1993 | Nimerick |
| 5,330,005 | A | 7/1994 | Card |
| 5,420,174 | A | 5/1995 | Dewprashad |
| 5,439,059 | A | 8/1995 | Harris |
| 5,497,830 | A | 3/1996 | Boles |
| 5,521,257 | A | 5/1996 | Ross |
| 5,529,122 | A | 6/1996 | Thach |
| 5,551,516 | A | 9/1996 | Norman |
| 5,575,335 | A | 11/1996 | King |
| 5,624,886 | A | 4/1997 | Dawson |
| 5,650,379 | A | 7/1997 | Sydansk |
| 5,895,644 | A | 4/1999 | Albanese et al. |
| 6,177,385 | B1 | 1/2001 | Nimerick |
| 6,209,646 | B1 | 4/2001 | Reddy |
| 6,214,773 | B1 | 4/2001 | Harris |
| 6,227,295 | B1 | 5/2001 | Mitchell |
| 6,239,183 | B1 | 5/2001 | Farmer |
| 6,310,008 | B1 | 10/2001 | Rietjens |
| 6,419,016 | B1 | 7/2002 | Reddy |
| 6,435,277 | B1 | 8/2002 | Qu |
| 6,439,310 | B1 | 8/2002 | Scott |
| 6,482,866 | B1 | 11/2002 | Dahayanake |
| 6,488,091 | B1 | 12/2002 | Weaver |
| 6,506,710 | B1 | 1/2003 | Hoey |
| 6,703,352 | B2 | 3/2004 | Dahayanake |
| 6,794,340 | B2 | 9/2004 | Nguyen |
| 6,810,959 | B1 | 11/2004 | Qu |
| 6,844,296 | B2 | 1/2005 | Dawson |
| 7,001,872 | B2 | 2/2006 | Pyecroft et al. |
| 7,082,995 | B2 | 8/2006 | Hanes |
| 7,122,690 | B1 | 10/2006 | Putzig |
| 7,287,593 | B2 | 10/2007 | Hutchins |
| 7,299,876 | B2 | 11/2007 | Lord |
| 7,303,018 | B2 | 12/2007 | Cawiezel |
| 2002/0160920 | A1 | 10/2002 | Dawson |
| 2003/0114539 | A1 | 6/2003 | Weaver |
| 2003/0166471 | A1 | 9/2003 | Samuel |
| 2003/0236171 | A1 | 12/2003 | Nguyen |
| 2003/0236173 | A1 * | 12/2003 | Dobson et al. ................ 507/110 |
| 2004/0048750 | A1 | 3/2004 | Dawson et al. |
| 2004/0209780 | A1 | 10/2004 | Harris |
| 2005/0043454 | A1 * | 2/2005 | Ushida et al. ................ 524/241 |
| 2005/0077044 | A1 | 4/2005 | Qu |
| 2006/0032636 | A1 * | 2/2006 | Lord et al. ................ 166/308.2 |
| 2006/0225884 | A1 | 10/2006 | Harris |
| 2006/0229213 | A1 | 10/2006 | Harris |
| 2006/0234872 | A1 | 10/2006 | Mirakyan et al. |
| 2006/0243449 | A1 | 11/2006 | Welton |
| 2007/0087940 | A1 | 4/2007 | Du |
| 2007/0187642 | A1 | 8/2007 | Putzig |
| 2008/0280790 | A1 | 11/2008 | Mirakyan et al. |
| 2008/0287323 | A1 | 11/2008 | Li et al. |
| 2009/0145607 | A1 | 6/2009 | Li |
| 2009/0181865 | A1 | 7/2009 | Dessinges et al. |

FOREIGN PATENT DOCUMENTS

| | | |
|---|---|---|
| EP | 0282253 | 6/1994 |
| EP | 1398459 | 3/2004 |
| GB | 2108122 A | 5/1983 |
| WO | 9926598 A1 | 6/1999 |
| WO | 0034382 | 6/2000 |
| WO | 03050387 | 6/2003 |
| WO | 2008068467 | 6/2008 |

OTHER PUBLICATIONS

Yaritz, J., Stegent, N., Bailey, T. Fritchr, E. Development of a Dual Crosslinker Fracturing Fluid System. SPE 38959 (1997).

Rose, J. et al. Aqueous Zirconium Complexes for Gelling Polymers. A Combined X-ray Absorption Spectroscopy and Quantum Mechanical Study. J. Phys. Chem. B 2003, 107, 2910-2920.

Omari, A. Gelation Control of the Scleroglucan-Zirconium Systems using Oxyacids. Polyer, vol. 36, No. 22, pp. 4263-4265. 1995 Elsevier Science Ltd.

ISO 13503-1:2003, "Petroleum and natural gas industries—Completion fluids and materials—Part 1: Measurement of viscous properties of completion fluids", ISO, 2007.

Kirk, et al., "Nuts Encyclopedia of Chemical Technology", Third Edition, Wiley-Interscience, vol. 16, 1981, pp. 248-273.

Mark, et al., "Oilfield Applications", Encyclopedia of Polymer Science and Engineering, vol. 10, John Wiley & Sons, Inc., 1987, pp. 328-366.

Sax, N. Irving, "Hawley's Condensed Chemical Dictionary", 11th Edition, Published by John Wiley & Sons, Inc 1987, p. 888.

International Search Report and Written Opinion issued in PCT/IB2010/055884 on Aug. 23, 2011, 6 pages.

* cited by examiner

METHOD FOR TREATING WELLBORE IN A SUBTERRANEAN FORMATION WITH HIGH DENSITY BRINES AND COMPLEXED METAL CROSSLINKERS

CROSS-REFERENCE TO RELATED APPLICATIONS

This application is a Continuation-in-part of, and claims the benefit of, U.S. patent application Ser. No. 12/116,730, filed May 7, 2008, now U.S. Pat. No. 8,697,610 which is incorporated herein by reference in its entirety. This application is also a Continuation-in-part of, and claims the benefit of, U.S. patent application Ser. No. 12/116,759, filed May 7, 2008, now U.S. Pat. No. 7,786,050 which is incorporated herein by reference in its entirety.

FIELD OF THE INVENTION

The invention relates to method for treating a well bore within a subterranean formation. More particularly, some embodiments relate to methods of fracturing using an aqueous crosslinked polysaccharide polymer with a zirconium, glutamic acid and polyol complex.

BACKGROUND

The statements in this section merely provide background information related to the present disclosure and may not constitute prior art.

In the art of recovering hydrocarbon values from subterranean formations, it is common, particularly in formations of low permeability, to hydraulically fracture the hydrocarbon-bearing formation to provide flow channels to facilitate production of the hydrocarbons to the wellbore. Fracturing fluids typically comprise a water or oil base fluid incorporating a polymeric thickening agent. The polymeric thickening agent helps to control leak-off of the fracturing fluid into the formation, aids in the transfer of hydraulic fracturing pressure to the rock surfaces and, primarily, permits the suspension of particulate proppant materials which remain in place within the fracture when fracturing pressure is released.

Typical polymeric thickening agents for use in fracturing fluids are polysaccharides polymers. For example, fracturing fluids comprise galactomannan gums such as guar and substituted guars such as hydroxypropyl guar or carboxymethylhydroxypropyl guar. Cellulosic polymers such as hydroxyethyl cellulose may also be used as well as synthetic polymers such as polyacrylamide. To increase the viscosity and, thus, the proppant carrying capacity as well as to increase the high temperature stability of the fracturing fluid, crosslinking of the polymers is also commonly practiced. Typical crosslinking agents comprise soluble boron, zirconium or titanium compounds. These metal ions provide for crosslinking or tying together of the polymer chains to increase the viscosity and improve the rheology of the fracturing fluid.

Of necessity, fracturing fluids are prepared on the surface and then pumped through tubing in the wellbore to the hydrocarbon-bearing subterranean formation. While high viscosity is a desirable characteristic of a fluid within the formation in order to efficiently transfer fracturing pressures to the rock as well as to reduce fluid leak-off, large amounts of hydraulic horsepower are required to pump such high viscosity fluids through the well tubing to the formation. In order to reduce the friction pressure, various methods of delaying the crosslinking of the polymers in a fracturing fluid have been developed. This allows the pumping of a relatively less viscous fracturing fluid having relatively low friction pressures within the well tubing with crosslinking being effected at or near the subterranean formation so that the advantageous properties of the thickened crosslinked fluid are available at the rock face.

One of the challenges in fracturing deep wells is reducing surface treating pressure. Deeper reservoirs usually have higher bottomhole pressures and deeper wells give rise to higher friction pressure. These factors lead to increase in treating pressure when stimulating these wells, sometimes in excess of 15,000 psi, which is the current limit of the completion tubular and pumping equipment. One way to reduce surface treating pressure is to increase fluid density, and take advantage of the hydrostatic head ($P_{hydrostatic}$) provided by heavy brines (composed of water and a large amount of salts) to formulate the fluid (equation 1); here, $P_{BHP}$ refers to the treating pressure at the point where the fracture is being created, and $P_{friction}$ refers to the friction pressure.

$$P_{surface} = P_{BHP} + P_{friction} - P_{hydrostatic} \qquad (1)$$

Fluids containing polymers crosslinked by metal ions display high viscosities at temperature in excess of 150° C., making them suitable for fracturing deep, high temperature wells. However, these metal-crosslinked fluids are typically shear-sensitive, i.e. they irreversibly lose viscosity if sheared at high rates that are commonly encountered in the tubulars.

SUMMARY

Incorporation of appropriate ligands that complex the metal ions helps to avoid this problem by delaying the crosslinking reaction until the fracturing fluid exits the tubing. The effectiveness of ligands to complex metal ions and delay crosslinking usually decreases with an increase in the amount of salts present in the fluid. In order to avoid irreversible degradation due to shear in the tubulars, it is preferred that metal ion crosslinking is delayed till the fluid encounters temperatures ~10° C. in excess of the surface mix water temperature (which can be as high as 45° C.). The current embodiments disclose a method to complex zirconium and employing the complex as a crosslinker for polysaccharides in high density monovalent brines.

In a first aspect, a method of treating a wellbore is disclosed by providing an aqueous mixture of a hydrated polysaccharide with a salt; adding thereto a cross-linking agent for cross-linking the hydrated polysaccharide, wherein the cross-linking agent comprises a zirconium compound, glutamic acid, and a polyol; pumping the aqueous mixture of the hydrated polysaccharide and the cross-linking agent into the wellbore; and cross-linking the hydrated polysaccharide.

In a second aspect, a method of fracturing a subterranean formation of a wellbore is disclosed by providing a brine of a hydrated polysaccharide; adding thereto a cross-linking agent for cross-linking the hydrated polysaccharide, wherein the cross-linking agent comprises a zirconium compound, glutamic acid, and a polyol; pumping the brine of the hydrated polysaccharide and the cross-linking agent into the wellbore to the subterranean formation at fracturing pressures; and cross-linking the hydrated polysaccharide at the conditions of the subterranean formation.

In one embodiment, when an aqueous mixture is used, the mixture is brine. The brine can be monovalent. The aqueous mixture can further comprise an acid buffer.

In some embodiments, the polyol can be selected from the group consisting of glycerol, glucose, lactose, rhamnose, mannose, sorbitol, alkyl glucoside and mixtures thereof and the polysaccharide can be selected from the group consisting of hydroxypropyl guar, carboxymethyl guar, carboxymethylhydroxypropyl guar, hydroxyethylcellulose, hydroxypropylcellulose and carboxymethylhydroxyethylcellulose. Also included in the term polyols are associated derivatives as the acid, acid salt, ester, hydrogenation and amine derivatives of these polyols.

The cross-linking agent can further comprise a boron compound in one embodiment. The subterranean formation can have a temperature greater than 150° C.

The fluid may further comprise surfactants, breakers, breaker aids, oxygen scavengers, alkaline pH adjusting agents, clay stabilizers, high temperature stabilizers, alcohols, proppant, scale inhibitors, corrosion inhibitors, fluid-loss additives, or bactericides.

DETAILED DESCRIPTION

Figure 1:
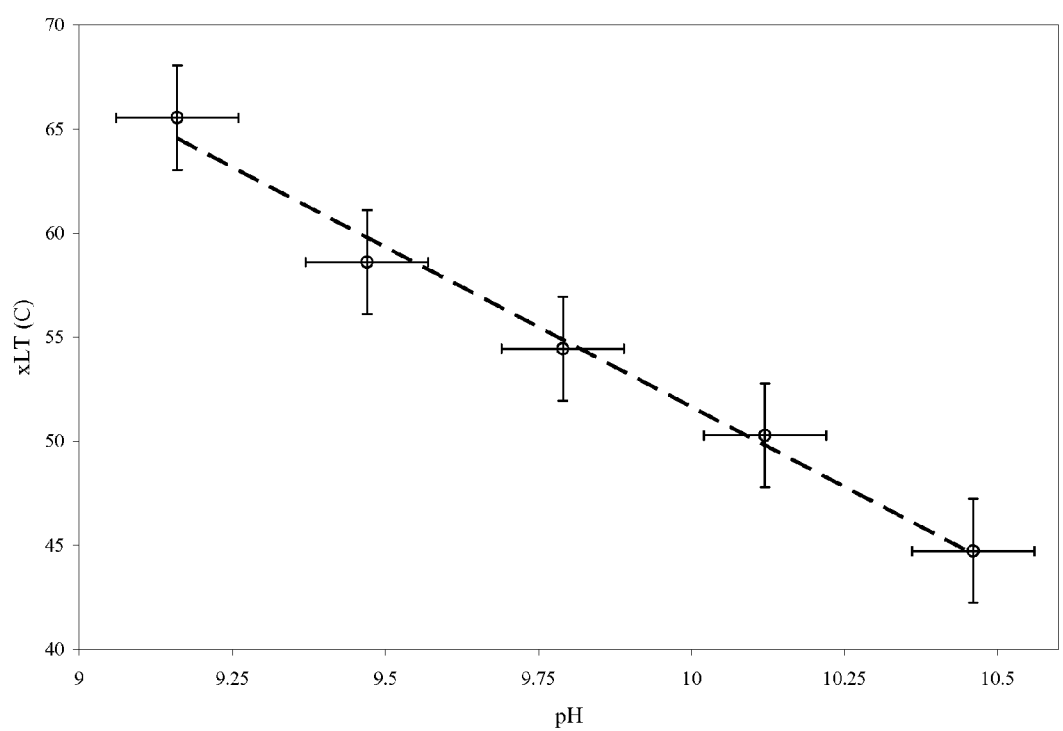
FIG. 1 shows graph of crosslinking temperature measurements performed on a series of polysaccharides-NaBr—Zr gels formulated at several different pH values.

At the outset, it should be noted that in the development of any actual embodiments, numerous implementation-specific decisions must be made to achieve the developer's specific goals, such as compliance with system and business related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating embodiments of the invention and should not be construed as a limitation to the scope and applicability of the invention. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range disclosed and enabled the entire range and all points within the range.

In a first embodiment, the method provides an aqueous mixture of a hydrated polysaccharide with a salt with a cross-linking agent for cross-linking the hydrated polysaccharide, wherein the cross-linking agent comprises a zirconium compound, glutamic acid, and a polyol.

The aqueous mixture is first prepared by blending a hydratable polymer into an aqueous fluid. The aqueous fluid could be, for example, water, aqueous based foams or water-alcohol mixtures with a salt. The aqueous fluid could also be brine. Any suitable mixing apparatus may be used for this procedure. In one embodiment, the mixture is a high density monovalent brine, with a salinity concentration higher than 10% by weight, or higher than 20% by weight, or higher than 40% by weight. The salinity concentration can be in the range of 0 to 50% by weight. According to one embodiment, the sodium bromide brine is 12.7 pounds-per-gallon, i.e. a sodium bromide salt concentration of 46% by weight.

In the case of batch mixing, the hydratable polymer and the aqueous fluid are blended for a period of time sufficient to form a hydrated solution. The hydratable polymer that is useful in the present invention can be any of the hydratable polysaccharides having galactose or mannose monomer units and are familiar to those in the well service industry. These polysaccharides are used as viscosifying agents; they are capable of gelling in the presence of a crosslinking agent to form a gelled base fluid.

According to some embodiments, the method disclosed herein can be used with a variety of polysaccharide used as viscosifying agents, including, but not limited to, guar gums, high-molecular weight polysaccharides composed of mannose and galactose sugars, or guar derivatives such as hydroxypropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used. Any useful polymer may be used in either crosslinked form, or without crosslinker in linear form. Xanthan, diutan, and scleroglucan, three biopolymers, have been shown to be useful as viscosifying agents. Polysaccharide compounds can be combined with other viscosifying agents, as viscoelastic surfactant. Nonlimiting examples of suitable viscoelastic surfactants useful for viscosifying some fluids include cationic surfactants, anionic surfactants, zwitterionic surfactants, amphoteric surfactants, nonionic surfactants, and combinations thereof. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described in published application U.S. 20040209780A1, Harris et. al.

In some embodiments, the viscosifier is a water-dispersible, nonionic, hydroxyalkyl galactomannan polymer or a substituted hydroxyalkyl galactomannan polymer. Examples of useful hydroxyalkyl galactomannan polymers include, but are not limited to, hydroxy-$C_1$-$C_4$-alkyl galactomannans, such as hydroxy-$C_1$-$C_4$-alkyl guars. Preferred examples of such hydroxyalkyl guars include hydroxyethyl guar (HE guar), hydroxypropyl guar (HP guar), and hydroxybutyl guar (HB guar), and mixed $C_2$-$C_4$, $C_2$/$C_3$, $C_3$/$C_4$, or $C_2$/$C_4$ hydroxyalkyl guars. Hydroxymethyl groups can also be present in any of these.

As used herein, substituted hydroxyalkyl galactomannan polymers are obtainable as substituted derivatives of the hydroxy-$C_1$-$C_4$-alkyl galactomannans, which include: 1) hydrophobically-modified hydroxyalkyl galactomannans, e.g., $C_1$-$C_{18}$-alkyl-substituted hydroxyalkyl galactomannans, e.g., wherein the amount of alkyl substituent groups is preferably about 2% by weight or less of the hydroxyalkyl galactomannan; and 2) poly(oxyalkylene)-grafted galactomannans (see, e.g., A. Bahamdan & W. H. Daly, in Proc. 8PthP Polymers for Adv. Technol. Int'l Symp. (Budapest, Hungary, September 2005) (PEG- and/or PPG-grafting is illustrated, although applied therein to carboxymethyl guar, rather than directly to a galactomannan)). Poly(oxyalkylene)-grafts thereof can comprise two or more than two oxyalkylene residues; and the oxyalkylene residues can be $C_1$-$C_4$ oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly(oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers according to the present disclosure can also be used.

As used herein, galactomannans comprise a polymannose backbone attached to galactose branches that are present at an average ratio of from 1:1 to 1:5 galactose branches:mannose residues. Galactomannans may comprise a 1→4-linked β-D-mannopyranose backbone that is 1→6-linked to α-D-galactopyranose branches. Galactose branches can comprise from 1 to about 5 galactosyl residues; in various embodiments, the average branch length can be from 1 to 2, or from 1 to about 1.5 residues. Branches may be monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans are preferred. In various embodiments, legume seed galactomannans can be used, examples of which include, but are not limited to: tara gum (e.g., from *Cesalpinia spinosa* seeds) and guar gum (e.g., from *Cyamopsis tetragonoloba* seeds). In addition, although embodiments may be described or exemplified with reference to guar, such as by reference to hydroxy-$C_1$-$C_4$-alkyl guars, such descriptions apply equally to other galactomannans, as well.

When incorporated, the polysaccharide polymer based viscosifier may be present at any suitable concentration. In various embodiments hereof, the gelling agent can be present in an amount of from about 5 to about 60 pounds per thousand gallons of liquid phase, or from about 15 to about 40 pounds per thousand gallons, from about 15 to about 35 pounds per thousand gallons, 15 to about 25 pounds per thousand gallons, or even from about 17 to about 22 pounds per thousand gallons. Generally, the gelling agent can be present in an amount of from about 10 to less than about 50 pounds per thousand gallons of liquid phase, with a lower limit of polymer being no less than about 10, 11, 12, 13, 14, 15, 16, 17, 18, or 19 pounds per thousand gallons of the liquid phase, and the upper limited being less than about 50 pounds per thousand gallons, no greater than 59, 54, 49, 44, 39, 34, 30, 29, 28, 27, 26, 25, 24, 23, 22, 21, or 20 pounds per thousand gallons of the liquid phase. In some embodiments, the polymers can be present in an amount of about 20 pounds per thousand gallons. Hydroxypropyl guar, carboxymethyl hydroxypropyl guar, carboxymethyl guar, cationic functional guar, guar or mixtures thereof, are preferred polymers for use herein as a gelling agent. Fluids incorporating polymer based viscosifiers based viscosifiers may have any suitable viscosity, preferably a viscosity value of about 50 mPa·s or greater at a shear rate of about 100 $s^{-1}$ at treatment temperature, more preferably about 75 mPa·s or greater at a shear rate of about 100 $s^{-1}$, and even more preferably about 100 mPa·s or greater.

The cross-linking agent comprises a complex formed from zirconium compound, glutamic acid, and polyol.

The crosslinking agent comprises a zirconium compound; also an organometallic or organic complexed metal ion comprising at least one transition metal or alkaline earth metal ion as well as mixtures thereof can be added. Typically, the crosslinking agent is employed in the composition in a concentration of from about 0.001 percent to about 2 percent, or from about 0.005 percent to about 1.5 percent, or from about 0.01 percent to about 1.0 percent.

Crosslinking agents are reagents, such as organometallic and organic complexed metal compounds, which can supply zirconium IV ions such as, for example, zirconium lactate, zirconium lactate triethanolamine, zirconium carbonate, zirconium acetylacetonate and zirconium diisopropylamine lactate. Zr (IV) may further be added directly as ions or oxy ions into the composition. Such organometallic and organic complexed metal crosslinking agents containing zirconium in a +4 valence state include those disclosed in British Pat. No. 2,108,122, herein incorporated herein by reference, which are prepared by reacting zirconium tetraalkoxides with alkanolamines under essentially anhydrous conditions. Other zirconium crosslinking agents are described, for example, in U.S. Pat. No. 3,888,312; U.S. Pat. No. 3,301,723; U.S. Pat. No. 4,460,751; U.S. Pat. No. 4,477,360; Europe Pat. No. 92,755; and U.S. Pat. No. 4,780,223, all of which are herein incorporated by reference. Such organometallic and organic complexed metal crosslinking agents containing zirconium in a +4 oxidation valance state may contain one or more alkanolamine ligands such as ethanolamine (mono-, di- or triethanolamine) ligands. Further, the compounds may be supplied as inorganic oxides, such as zirconium dioxide. Such crosslinking agents are typically used at a pH also in the range from about 6 to about 13.

A dual crosslinking agent can be used as well. In some embodiments, a zirconium compound and a borate ion releasing compound are used. Borate ion releasing compounds which can be employed include, for example, any boron compound which will supply borate ions in the composition, for example, boric acid, alkali metal borates such as sodium diborate, potassium tetraborate, sodium tetraborate (borax), pentaborates and the like and alkaline and zinc metal borates. Such borate ion releasing compounds are disclosed in U.S. Pat. No. 3,058,909 and U.S. Pat. No. 3,974,077 herein incorporated by reference. In addition, such borate ion releasing compounds include boric oxide (such as selected from $H_3BO_3$ and $B_2O_3$) and polymeric borate compounds. Mixtures of any of the referenced borate ion releasing compounds may further be employed. Such borate-releasers typically require a basic pH (e.g., 7.0 to 12) for crosslinking to occur.

The crosslinking agent contains a glutamic acid according to the formula:

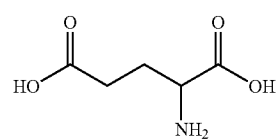

According to some embodiments, the crosslinking agent may contain the carboxylate anions and salts of glutamic acid also known as glutamates.

The polyols are defined in one non-limiting embodiment as polyols having at least one hydroxyl group on two adjacent carbon atoms. The adjacent carbon atoms may have more than one hydroxyl group, and the polyol may have more than two adjacent carbon atoms, each having at least one hydroxyl group. In another embodiment, the polyols are monosaccharides, which are glycerols (trihydric monosaccharides having three hydroxyl groups) and sugar alcohols (having more than three hydroxyl groups) and oligosaccharides. In another embodiment, the polyols may have one of the following formulae:

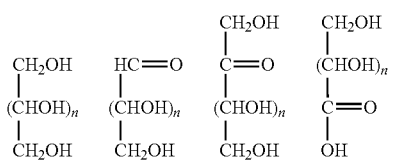

where n is from 2 to 5, and the hydroxyls may be in the cis or trans orientation. In another embodiment, the polyols are acids, acid salts, fatty acids (alkyl glycosides), and alcohol, alkyl and amine derivatives (glycosylamines) of monosaccharides and oligosaccharides. Specific examples of polyols falling within these definitions include, but are not necessarily limited to, mannitol (manna sugar, mannite), sorbitol (D-sorbite, hexahydric alcohol), xylitol, glycerol, glucose, (dextrose, grape sugar, corn sugar), fructose (fruit sugar, levulose), maltose, lactose, tagatose, psicose, galactose, xylose (wood sugar), allose (β-D-allopyranose), ribose, arabinose, rhamnose, mannose, altrose, ribopyranose, arabinopyranose, glucopyranose, gulopyranose, galatopyranose, psicopyranose, allofuranose, gulofuranose, galatofuranose, glucosamine, chondrosamine, galactosamine, ethyl-hexo glucoside, methyl-hexo glucoside, aldaric acid, sodium aldarate, glucaric acid, sodium glucarate, gluconic acid, sodium gluconate, glucoheptonic acid, sodium glucoheptonate, and mixtures thereof. In one non-limiting embodiment, the molecular weight of the simple polyols may range from about 65 to about 500, where an alternate embodiment for the molecular weight ranges from about 90 to about 350. Oligosaccharides may have molecular weights ranging from about 450 to about 5000 in one non-limiting embodiment, with most ranging from about 480 to about 1000 in another non-limiting embodiment.

In one non-limiting embodiment, the low molecular weight polyols have an absence of non-reducing sugars. In another non-limiting embodiment, the low molecular weight polyols have an absence of non-reducing disaccharides and non-reducing trisaccharides. The definition of "non-reducing" is the same as that given in U.S. Pat. No. 4,946,604, incorporated by reference herein.

The aqueous mixture after being prepared can be used in various applications in a subterranean formation from a wellbore. The fluid may be not foamed, foamed, or energized, depending upon the particular formation properties and treatment objective.

Any suitable gas that forms a foam or an energized fluid when introduced into the aqueous medium can be used, see, for example, U.S. Pat. No. 3,937,283 (Blauer et al.) hereinafter incorporated by reference. The gas component may comprise a gas selected from the group consisting of nitrogen, air, carbon dioxide and any mixtures thereof. The gas component may comprise nitrogen, in any quality readily available. The gas component may in some cases assist in a fracturing operation and/or swell clean-up process. The fluid may contain from about 10% to about 90% volume gas component based upon total fluid volume percent, or from about 30% to about 80% volume gas component based upon total fluid volume percent, or from about 40% to about 70% volume gas component based upon total fluid volume percent.

In some embodiments, an acid buffer may be used to speed up the rate of hydration of polymer in brine. Embodiments may further contain other additives and chemicals. These include, but are not necessarily limited to, materials such as surfactants, breakers, breaker aids, oxygen scavengers, alkaline pH adjusting agents, clay stabilizers (i.e. KCl, TMAC), high temperature stabilizers, alcohols, proppant, scale inhibitors, corrosion inhibitors, fluid-loss additives, bactericides, and the like. Also, they may include a co-surfactant to optimize viscosity or to minimize the formation of stable emulsions that contain components of crude oil.

In a first aspect, the treatment method is used for hydraulically fracturing a subterranean formation. Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc. New York, N.Y., 1987) and references cited therein, the disclosures of which are incorporated herein by reference thereto.

In most cases, a hydraulic fracturing consists of pumping a proppant-free viscous fluid, or pad, usually water with some fluid additives to generate high viscosity, into a well faster than the fluid can escape into the formation so that the pressure rises and the rock breaks, creating artificial fractures and/or enlarging existing fractures. Then, proppant particles are added to the fluid to form a slurry that is pumped into the fracture to prevent it from closing when the pumping pressure is released. The proppant suspension and transport ability of the treatment base fluid traditionally depends on the type of viscosifying agent added.

In the fracturing treatment, fluids may be used in the pad treatment, the proppant stage, or both. The components of the fluid may be mixed on the surface. Alternatively, a portion of the fluid may be prepared on the surface and pumped down tubing while another portion could be pumped down the annular to mix down hole.

Another embodiment includes the fluid for cleanup. The term "cleanup" or "fracture cleanup" refers to the process of removing the fracture fluid (without the proppant) from the fracture and wellbore after the fracturing process has been completed. Techniques for promoting fracture cleanup traditionally involve reducing the viscosity of the fracture fluid as much as practical so that it will more readily flow back toward the wellbore.

In another embodiment, fluid is useful for gravel packing a wellbore. As a gravel packing fluid, it may comprise gravel or sand and other optional additives such as filter cake clean up reagents such as chelating agents referred to above or acids (e.g. hydrochloric, hydrofluoric, formic, acetic, citric acid) corrosion inhibitors, scale inhibitors, biocides, leak-off control agents, among others. For this application, suitable gravel or sand is typically having a mesh size between 8 and 70 U.S. Standard Sieve Series mesh.

To facilitate a better understanding of the present invention, the following examples of embodiments are given. In no way should the following examples be read to limit, or define, the scope of the invention.

EXAMPLES

A series of experiments were conducted to demonstrate method to treat a wellbore.

In a first example, effect of crosslinking delay with various ligands is tested. Carboxymethylhydroxypropylguar (CMHPG) in the amount of 0.96 g was mixed into 200 mL of 2% potassium chloride (KCl) solution or 11 pounds-per-gallon (ppg) (1.32 kg/L) sodium bromide (NaBr) brine (prepared by blending 1.5 kg/L NaBr brine from MI-Swaco and Sugar Land tap water). The polymer was allowed to hydrate for 15 minutes. In 11 ppg NaBr, sodium diacetate buffer was used to accelerate hydration of the polymer. Subsequently, tetraethylenepentamine (TEPA) was added in an amount sufficient to modify the pH of the solution to 10±0.2. Finally, complexed zirconium (Zr) crosslinker, in an amount providing a concentration of $[Zr]=2.7*10^{-4}$ mol/L, was added to the mixture.

Crosslinking temperature (xLT) measurements were performed by placing the above mixtures in a microwave and heating them 5 seconds at a time. The temperature at which the fluid formed an elastic lip was defined as xLT. xLT values for several zirconium complexes in 2% KCl and 1.32 kg/L NaBr are summarized in Table 1. The presence of NaBr lowers xLT, i.e. reduces the effectiveness of all ligands tested here, to bind zirconium. The ligands that are suitable in 2% KCl result in too low of a xLT when used to formulate fluids in 11 ppg NaBr.

TABLE 1 xLT measurements with various zirconium complexes (all complexes contain 7:1 mol/mol triethanolamine:Zr and 2:1 mol/mol glutamic acid:Zr

| Brine type | Crosslinker name | [Sodium gluconate]:[Zr] (mol/mol) | [Sorbitol]:[Zr] (mol/mol) | Fluid pH | xLT (° C.) |
|---|---|---|---|---|---|
| 2% KCl | Z1* | 0 | 0 | 9.9 | 57 |
| 1.32 kg/L NaBr | Z1 | 0 | 0 | 9.9 | 43 |
| 2% KCl | Z2** | 0.2 | 0 | 10.0 | 74 |
| 1.32 kg/L NaBr | Z2 | 0.2 | 0 | 9.9 | 57 |
| 2% KCl | Z3↓ | 0 | 0.3 | 10.0 | 68 |
| 1.32 kg/L NaBr | Z3 | 0 | 0.3 | 9.8 | 54 |
| 1.32 kg/L NaBr | Z4† | 0.05 | 0 | 10.0 | 52 |

*Composition of Z1: 2.95 g zirconium oxychloride octahydrate, 12 g de-ionized water, 2.7 g L-glutamic acid, 11.25 g triethanolamine. Z1 was prepared by mixing the above contents and aging the mixture overnight at 49° C.
**Composition of Z2: 10 ml of Z1 and 0.077 g sodium gluconate - aged overnight at 49° C.
↓Composition of Z3: 10 ml of Z1 and 0.194 g sorbitol - aged overnight at 49° C.
†Composition of Z4: 4 ml of Z1 and 0.0157 g sodium gluconate - aged overnight at 49° C.

In as second example, effect of pH on crosslinking delay is tested. Carboxymethylhydroxypropylguar (CMHPG) in the amount of 0.96 g was mixed into 200 mL of 11 pounds-per-gallon (1.32 kg/L) sodium bromide brine (NaBr). The polymer was allowed to hydrate for 15 minutes; sodium diacetate buffer was used to accelerate hydration of the polymer. Different amount of TEPA were added for each of the data points in FIG. 1. Finally, complexed zirconium (Zr) crosslinker Z3, in an amount providing a concentration of $[Zr]=2.7*10^{-4}$ mol/L, was added to the mixture. xLT measurements were then performed using each of the above gels. In the pH range that was investigated, xLT was found to be inversely related to the pH. Thus, the fluid pH serves as a design parameter that can be used to manipulate the xLT of the fluid.

Figure 2:
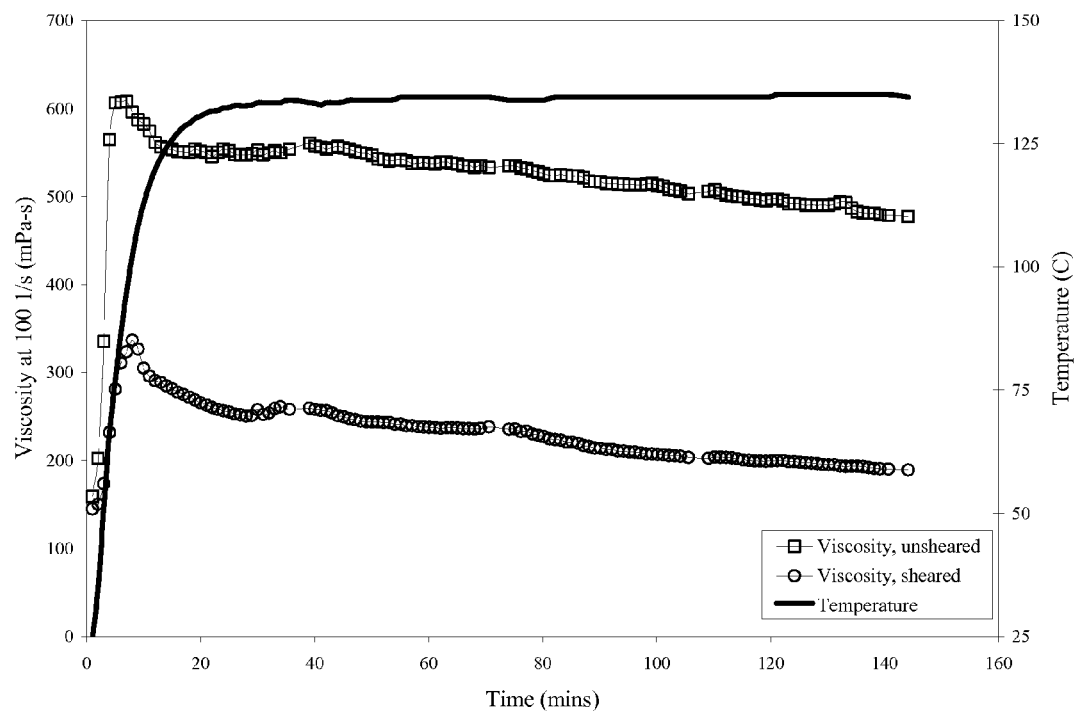
FIG. 2 shows graph of viscosity of unsheared and sheared polysaccharides-NaBr—Zr gels prepared with a crosslinker package not containing polyol.

In a third example, shear history at 38° C.—Zr crosslinker with no polyol is tested. Carboxymethylhydroxypropylguar (CMHPG) in the amount of 7.2 g was mixed into 1500 mL of 11 pounds-per-gallon (1.32 kg/L) sodium bromide brine (NaBr). The polymer was allowed to hydrate for 15 minutes; sodium diacetate buffer was used to accelerate hydration of the polymer. Subsequently, 2.25 mL of TEPA and complexed Zr crosslinker Z1, in an amount providing a concentration of $[Zr]=2.7*10^{-4}$ mol/L, were added to the mixture, resulting in a fluid having a pH of 9.91. A 50 mL aliquot of this fluid was loaded onto a pre-heated Grace 5600 rheometer and its viscosity was measured at 135° C. and 100 s$^{-1}$—this is termed the 'unsheared sample'. The remaining fluid was then pumped through 360' (109.7 m) of 0.08" (0.2 cm) i.d. tubing (immersed in a water bath at 38° C.) at a rate equivalent to a wall shear rate of 1350 s$^{-1}$. The exiting fluid was loaded onto a pre-heated Grace M5600 rheometer and the viscosity of the sheared fluid was measured at 135° C. and 100 s$^{-1}$—this is termed the 'sheared sample'. This procedure is described in ISO 13503-1, 2003, Petroleum and natural gas industries—Completion fluids and materials—Part 1: Measurement of viscous properties of completion fluids. Clearly, shear through the tubing resulted in irreversible loss of viscosity of the fluid. Results are shown on FIG. 2.

Figure 3:
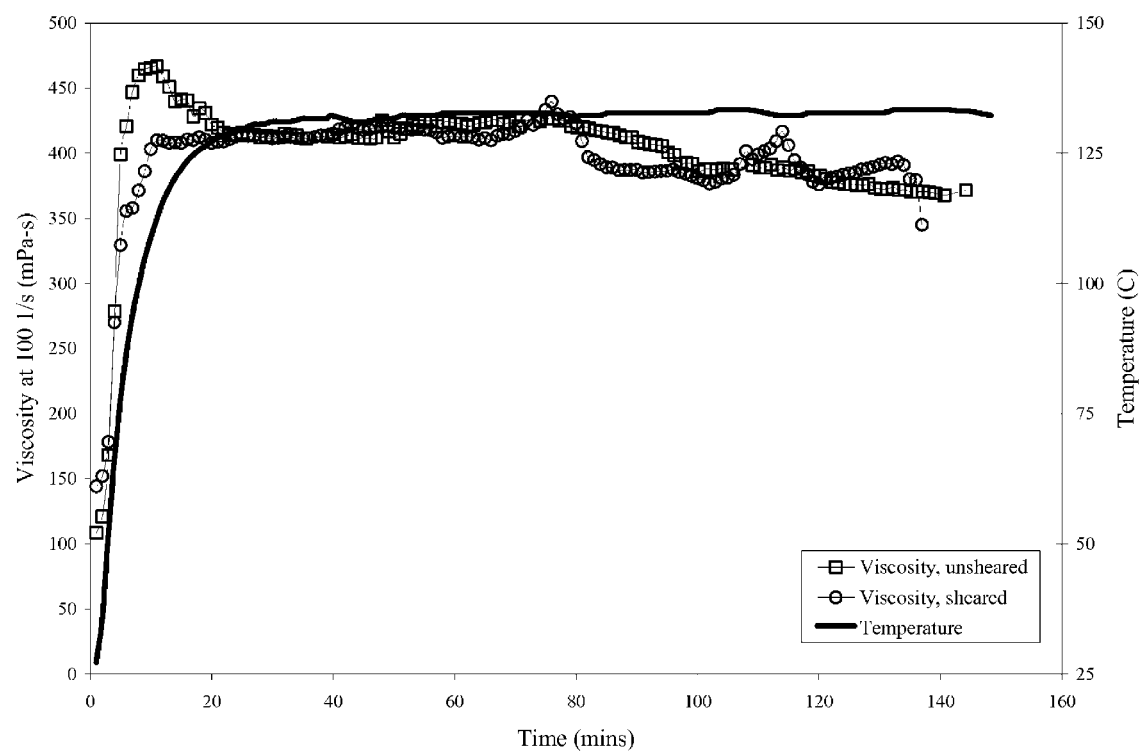
FIG. 3 shows graph of viscosity of unsheared and sheared polysaccharides-NaBr—Zr gels prepared with a crosslinker package containing polyol.

In a fourth example, shear history at 43° C.—Zr crosslinker with polyol is tested. Carboxymethylhydroxypropylguar (CMHPG) in the amount of 7.2 g was mixed into 1500 mL of 11 pounds-per-gallon (1.32 kg/L) sodium bromide brine (NaBr). The polymer was allowed to hydrate for 15 minutes; sodium diacetate buffer was used to accelerate hydration of the polymer. Subsequently, 2.25 mL of TEPA and complexed Zr crosslinker Z4, in an amount providing a concentration of $[Zr]=3.6*10^{-4}$ mol/L, were added to the mixture, resulting in a fluid having pH=9.87. A 50 mL aliquot of this fluid was loaded onto a pre-heated Grace 5600 rheometer and its viscosity was measured at 135° C. and 100 s$^{-1}$—this is termed the 'unsheared sample'. The remaining fluid was then pumped through 360' (109.7 m) of 0.08" (0.2 cm) i.d. tubing (immersed in a water bath at 43° C.) at a rate equivalent to a wall shear rate of 1350 s$^{-1}$. The exiting fluid was loaded onto a pre-heated Grace M5600 rheometer and the viscosity of the sheared fluid was measured at 135° C. and 100 s$^{-1}$—this is termed the 'sheared sample'. Clearly, shear has a negligible effect on the viscosity of a CMHPG-NaBr gel, using a zirconium crosslinker package containing polyol. Results are shown on FIG. 3.

Figure 4:
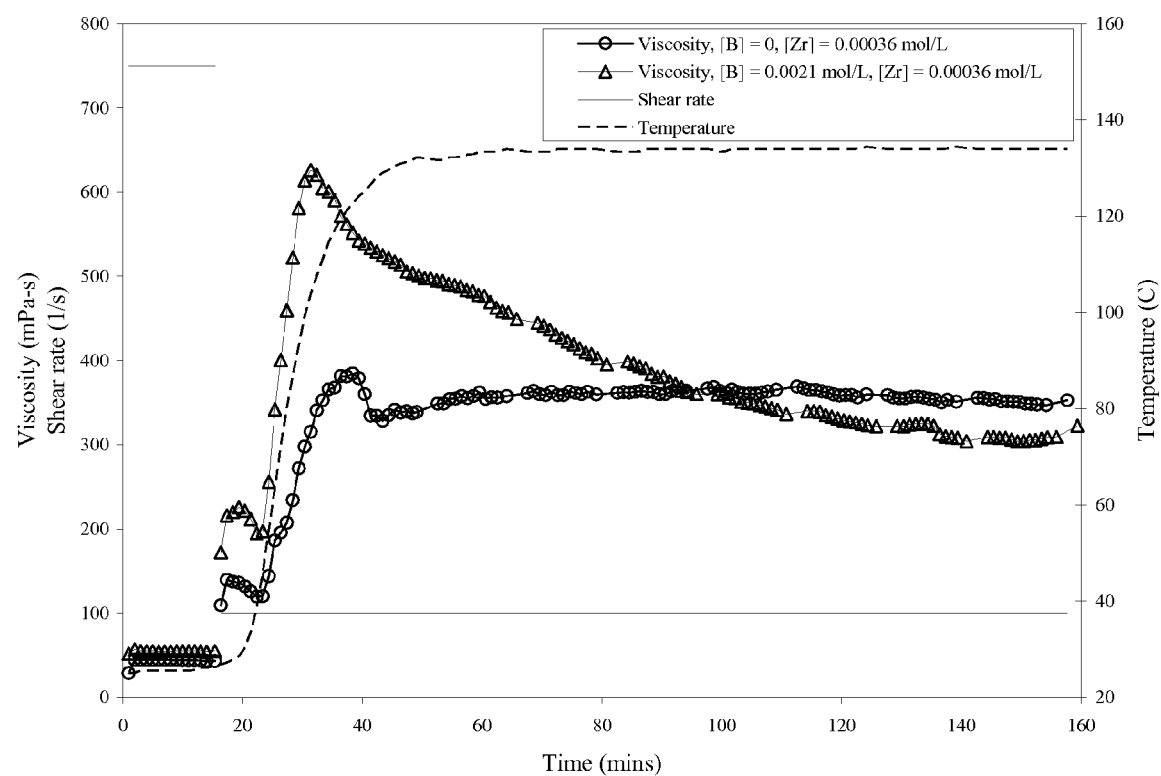
FIG. 4 shows graph of viscosities of polysaccharides-NaBr—Zr gels formulated with and without boron.

In a fifth example, viscosity of boron-zirconium dual crosslinked fluid is tested. Carboxymethylhydroxypropylguar (CMHPG) in the amount of 0.96 g was mixed into 200 mL of 11 pounds-per-gallon (1.32 kg/L) sodium bromide brine (NaBr). The polymer was allowed to hydrate for 15 minutes; sodium diacetate buffer was used to accelerate hydration of the polymer. 1.5 mL of TEPA was added, followed by complexed Zr crosslinker Z2 in an amount providing a concentration of $[Zr]=3.6*10^{-4}$ mol/L. Subsequently, a borax ($Na_2B_4O_7 \cdot 10H_2O$) solution was added to the mixture, in an amount providing a concentration of $[B]=2.1*10^{-3}$ mol/L. This fluid was then loaded on to a Grace M5600 rheometer and the following shear and temperature conditions were imposed on the sample—(a) 750 s$^{-1}$ at 27° C. for 15 minutes, followed by (b) 100 s$^{-1}$ at 135° C. An identical test was run with a fluid prepared without boron crosslinker. Results from these two tests are shown in FIG. 4. Boron provides ambient temperature thickening (evidenced by a higher viscosity than the sample without boron, immediately after the shear rate is changed from 750 s$^{-1}$ to 100 s$^{-1}$), before zirconium crosslinking is activated upon heating.

The foregoing disclosure and description of the invention is illustrative and explanatory thereof and it can be readily appreciated by those skilled in the art that various changes in the size, shape and materials, as well as in the details of the illustrated construction or combinations of the elements described herein can be made without departing from the spirit of the invention.

What is claimed is:

1. A method comprising:
    (a) providing an aqueous mixture of a hydrated polysaccharide with a salt;
    (b) adding to the mixture a cross-linking agent for cross-linking the hydrated polysaccharide, wherein the cross-linking agent is added as a complex comprising a zirconium compound, glutamic acid, and a polyol, and whereby the complex of zirconium compound, glutamic acid, and polyol provides delayed crosslinking of the zirconium compound with the polysaccharide;
    (c) pumping the aqueous mixture of the hydrated polysaccharide and the cross-linking agent into a wellbore; and
    (d) cross-linking the hydrated polysaccharide.

2. The method of claim 1, wherein the aqueous mixture further comprises an acid buffer.

3. The method of claim 1, wherein the polyol is selected from the group consisting of glycerol, glucose, lactose, rhamnose, mannose, sorbitol, alkyl glucoside, sodium gluconate, associated derivatives and mixtures thereof.

4. The method of claim 1, wherein the polysaccharide is selected from the group consisting of hydroxypropyl guar, carboxymethyl guar, carboxymethylhydroxypropyl guar, hydroxyethylcellulose, hydroxypropylcellulose and carboxymethylhydroxyethylcellulose.

5. The method of claim 1, wherein the cross-linking agent further comprises a boron compound.

6. The method of claim 1, wherein the aqueous mixture further comprises surfactants, breakers, breaker aids, oxygen scavengers, alkaline pH adjusting agents, clay stabilizers, high temperature stabilizers, alcohols, proppant, scale inhibitors, corrosion inhibitors, fluid-loss additives, or bactericides.

7. The method of claim 1, whereby the salt provides increased fluid density, and wherein the aqueous mixture is a monovalent brine baying a salinity concentration of from greater than 15% by weight.

8. The method of claim 1, whereby the salt provides increased density, and wherein the aqueous mixture is a monovalent brine having a salinity concentration of from 20% by weight to 40% by weight.

9. A method of treating, a subterranean formation adjacent a wellbore, the method comprising:
    (a) providing a brine of a hydrated polysaccharide;
    (b) adding a cross-linking agent for cross-linking the hydrated polysaccharide, wherein the cross-linking agent is added as a complex comprising a zirconium compound, glutamic acid, and a polyol, and whereby the complex of zirconium compound, glutamic acid, and polyol provides delayed crosslinking of the zirconium compound with the polysaccharide;
    (c) pumping the brine of the hydrated polysaccharide and the cross-linking agent into the wellbore to treat the subterranean formation; and
    (d) cross-linking the hydrated polysaccharide.

10. The method of claim 9, wherein the aqueous mixture further comprises an acid buffer.

11. The method of claim 9, wherein the polyol is selected from the group consisting of glycerol, glucose, lactose, rhamnose, mannose, sorbitol, alkyl glucoside, sodium gluconate, associated derivatives and mixtures thereof.

12. The method of claim 9, wherein the polysaccharide is selected from the group consisting of hydroxypropyl guar, carboxymethyl guar, carboxymethylhydroxypropyl guar, hydroxyethylcellulose, hydroxypropylcellulose and carboxymethylhydroxyethylcellulose.

13. The method of claim 9, wherein the cross-linking agent further comprises a boron compound.

14. The method of claim 9, wherein the subterranean formation has a temperature greater than 150° C.

15. The method of claim 9, wherein the brine further comprises surfactants, breakers, breaker aids, oxygen scavengers, alkaline pH adjusting agents, clay stabilizers, high temperature stabilizers, alcohols, proppant, scale inhibitors, corrosion inhibitors, fluid-loss additives, or bactericides.

16. A method of fracturing a subterranean formation adjacent a wellbore, the method comprising:
    (a) providing a brine of a hydrated polysaccharide;
    (b) adding a cross-linking agent for cross-linking the hydrated polysaccharide, wherein the cross-linking agent is added as a complex comprising a zirconium compound, glutamic acid, and a polyol, and whereby the complex of zirconium compound, glutamic acid, and polyol provides delayed crosslinking of the zirconium compound with the polysaccharide;
    (c) pumping the brine of the hydrated polysaccharide and the cross-linking agent into the wellbore to the subterranean formation at fracturing pressures; and
    (d) cross-linking the hydrated polysaccharide at the conditions of the subterranean formation.

17. The method of claim 16, wherein the subterranean formation has a temperature greater than 150° C.

18. The method of claim 16, wherein the aqueous mixture further comprises an acid buffer.

19. The method of claim 16, wherein the polyol is selected from the group consisting of glycerol, glucose, lactose, rhamnose, mannose, sorbitol, alkyl glucoside, sodium gluconate, associated derivatives and mixtures thereof.

20. The method of claim 16, wherein the polysaccharide is selected from the group consisting of hydroxypropyl guar, carboxymethyl guar, carboxymethylhydroxypropyl guar, hydroxyethylcellulose, hydroxypropylcellulose and carboxymethylhydroxyethylcellulose.

21. The method of claim 16, wherein the cross-linking agent further comprises a boron compound.

* * * * *